United States Patent Office 3,527,517

Patented Sept. 8, 1970

3,527,517

BIS-INDOLYL-ARYL-METHANE LIGHT SENSITIVE COMPOSITIONS

Ernst-August Hackmann, Wiesbaden-Biebrich, Germany, assignor to Kalle Aktiengesellschaft, Wiesbaden-Biebrich, Germany No Drawing. Filed Aug. 30, 1966, Ser. No. 575,979
Claims priority, application Germany, Sept. 1, 1965, K 57,013
Int. Cl. G03c 1/72
U.S. Cl. 96—90 8 Claims

ABSTRACT OF THE DISCLOSURE

Material useful for the preparation of re-enlargement copies of microfilm negatives includes a light-sensitive bis-indolyl-aryl-methane and an activator compound selected from carboxylic acids, -acid esters, and -acid amides, aldehydes, ketones, and thio-compounds. Heating the material to about 70–110° C. during imagewise exposure to visible light provides more rapid image formation. Re-enlarged images resulting from light-exposure are fixed by removing the activator with selective solvents comprising aqueous alkaline solutions or liquid aliphatic hydrocarbons.

The present invention relates to a novel, negative-working reproduction material. "Negative-working" means that the areas struck by light become visible. Further, the invention relates to a method of processing the reproduction material described further down, by which an optimum effect of the incident light is achieved.

It is known that the light-induced oxidation of certain leuco derivatives of dyestuffs can be accelerated by the addition of certain activators. This effect has already been utilized in the reproduction field. U.S. Pat. No. 3,121,632 describes, e.g., a light-sensitive, negative-working reproduction material the light-sensitive layer of which consists of the leuco base of a triphenyl methane dyestuff and activators. Ketones, aldehydes, and esters are mentioned as suitable activators. This layer changes its color under the action of ultraviolet light. Other reproduction materials of similar construction must also be irradiated with ultraviolet light if an image is to be formed. Moreover, the known materials are relatively insensitive to light, even with the action of ultraviolet light, so that long exposure times and very intensive light sources are required. For these reasons, the known reproduction materials containing layers of leuco dyestuffs and activators have not become widely used in practice.

However, because of the low cost of the light-sensitive substances mentioned above and the simplicity of processing the reproduction materials produced therefrom, the said substances and reproduction materials would nevertheless be of interest for reproduction purposes if the above mentioned drawbacks could be eliminated. It is an object of the present invention to provide a reproduction material with a light-sensitive layer containing a leuco dyestuff and an activator, the light-sensitivity of which would be mainly in the visible range of the spectrum and high enough to permit exposure of the reproduction material to commercial projectors. The latter requirement is essential since negative-working reproduction materials are preferably used for processing negative originals, positive copies being thus directly obtained. Negative originals exist in large numbers in the form of microfilm negatives on transparent supports. Numerous commercial re-enlargement devices are adapted to the use of microfilm negatives.

The light-sensitive reproduction material according to the invention consists of a support and a light-sensitive layer thereon. The light-sensitive layer contains mainly the following two components:

(1) The light-sensitive component itself, which is converted into a dyestuff. It consists of one or more bis-indolyl-aryl-methanes of the general formula

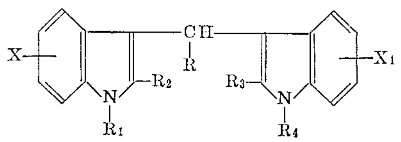

wherein:

X and $X_1$ which may be the same or different, stand for OH, O-alkyl, halogen, carboxyl or carboxyalkyl,
R stands for H, alkyl, aryl, substituted aryl, alkenyl, aralkyl, or a heterocyclic residue, and
$R_1$, $R_2$, $R_3$ and $R_4$, which may be the same or different, stand for H, alkyl, alkenyl, aralkyl, alkaryl, or aryl, and (2) 0.1 to 10 parts by weight of activator per part by weight of bis-indolyl-aryl-methane, said activator consisting of one or more colorless or weakly colored compounds with one or more >CO, >CS, —SH or —SS-groups, which are soluble in water, dilute aqueous solutions and/or organic solvents.

With the exception of the parent substance itself, some of the light-sensitive substances, i.e. the derivatives of bis-indolyl-aryl methane, are novel substances. The bis-indolyl-aryl methanes described exhibit a certain, very weak light-sensitivity even without activators, but this is not sufficient to be utilized for reproduction purposes without additional measures.

The bis-indolyl-aryl-methanes may be prepared, for instance, from two mols of indole, or a mixture of different indoles, which may be substituted at the pyrrole nucleus as well as at the aromatic nucleus, and one mol of aldehyde in accordance with the following equation:

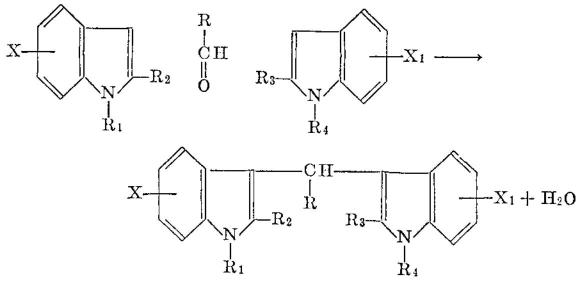

The reaction proceeds in known manner, in an alcoholic solution in the presence of acid catalysts, e.g. mineral acids or zinc chloride (see e.g. E. Fischer "Liebigs Annalen der Chemie," 242, 1887, page 372). If the starting material is a mixture of differently substituted indoles, asymmetrical condensation products are obtained besides symmetrical products. These mixtures are also suitable for use in the reproduction material according to the invention.

The bis-indolyl-aryl methanes are readily soluble in a few solvents only. The preferred solvent is acetone.

The following compounds are mentioned as suitable activators containing the above mentioned groups: aliphatic, aromatic and heterocyclic carboxylic acids, carboxylic acid esters, carboxylic acid amides, aldehydes, ketones, thioketones, thioalcohols, disulfides and thioureas. In spite of the obvious dissimilarity of the chemical compounds listed, they all cause a considerable increase of the light-sensitivity of the bis-indolyl-aryl methanes. So far, no satisfactory explanation could be found for the effect of these different compounds.

The activators may be colored or colorless substances. They may be colored because, as described in detail further below, they do not remain in the layer of the colored image but are washed away when the exposed material is fixed. Therefore, it is essential that the activators may be soluble in easily accessible, non-toxic solvents. However, the solvents must not dissolve the dyestuff formed from the bis-indolyl-aryl methanes. This requirement can be fulfilled relatively easily, because the dyestuffs, like their starting products, are relatively difficult to dissolve. Activators which are soluble in aqueous solutions of an alkali or in liquid aliphatic hydrocarbons are preferred, because the dyestuffs are insoluble in these solvents.

A list of preferred activators is given below.

The mixing ratio of light-sensitive substance and activator may vary within wide limits. Perfectly suitable reproduction materials are already obtained if the layers contain 0.1 part by weight of activator per part by weight of bis-indolyl-aryl methane. Even at a ratio of 10 parts by weight of activator per part by weight of light-sensitive substance suitable layers are still obtained. A ratio of 1:1 is preferred, the parts being by weight. With this mixing ratio, or a ratio which is only slightly different, optimum activation is generally achieved. However, activators are known which require considerably different mixing ratios to produce optimum activation. The most favorable ratio can be easily ascertained by means of test series using varying mixing ratios.

For the manufacture of the reproduction material according to the present invention, a mixture is prepared containing one or more bis-indolyl-aryl methanes and one or more activators, and this mixture is then applied in a suitable manner to a support and the solvent evaporated.

As already stated, acetone is the most suitable solvent, because both components dissolve easily therein. The concentration of disolved substance should preferably be in the range of 1 to 5 percent by weight, based on the weight of the solvent.

The application of the solution to a suitable support may be effected in known manner, e.g. by whirl-coating or brushing. The applied quantity of solvent is adjusted in such a manner that the dried layer has a weight of 0.5 to 10 g./cm.$^2$.

All sheet-like materials customarily used in the reproduction field are eligible as supports for the light-sensitive layer, e.g. metal foils, plastic films, glass, wood, textiles, films of cellulose derivatives and, preferaby, paper. The paper shoud be somewhat absorbent, so that the substances are easily and equally distributed. However, it must not be too absorbent, because otherwise the layer is completely absorbed by the paper. If supports are used which have only a limited absorption for the light-sensitive layer, it is advisable to add a small quantity of a binder to the coating solution. The binders may also be applied to the support in the form of a pre-coat. Practically all polymeric substances customarily used for this purpose may be used as binders, provided they are soluble in the preferably used solvent, viz. acetone.

The light-sensitivity of the reproduction material according to the invention is, indeed, such that it may be used for re-enlarging microfilms by means of projectors provided with normal incandescent bulbs which emit visible light. However, if no special measures are taken, exposure times of several minutes are required.

The presence of the activator in the layer calls for a fixation of the exposed reproduction material.

As indicated above, fixation is most easily effected by washing the activator from the layer with a suitable solvent. It was found that the compounds having a >COOH-group are best washed out with an alkaline aqueous solution. A 10 percent by weight solution of sodium carbonate has proved particularly suitable. Normally, the other carbonyl and thio compounds stated above can be easily removed with petrol ether.

Fixation can be effected by immersion of the exposed reproduction material in a suitable solvent or by wiping over with a sponge or cotton pad wet with solvent. Alternatively, fixation may be effected by means of suitable devices by which the solvent is distributed as a thin layer on a rotating roll which then contacts the layer side of the reproduction material.

Furthermore, it has been found that the reproduction material according to the invention becomes considerably more sensitive to light if it is heated during exposure to temperatures ranging from 70 to 110° C., preferably from 80 to 100° C. By this heating step, the reproduction material becomes 8 to 15 times more light-sensitive than it is at a temperature of about 20 to 30° C. This increase is completely unexpected. Although photographic silver halide films are known to become more light-sensitive when they are heated during exposure, their light-sensivity is not more than doubled.

Due to this effect, for the exposure of the reproduction material of the invention under commercial microfilms, exposure times are possible which render it interesting to use the reproduction material of the invention for the re-enlargement of microfilms. Depending on the density of the original and the enlargement scale, exposure times from 15 seconds to 2 minutes are required.

In short, the preferred method for processing the reproduction material according to the invention is characterized in that the reproduction material is heated, during exposure, to temperatures between 70 and 110° C., preferably between 80 and 100° C., and in that the image-wise exposed reproduction material, which already carries a visible image, is then rinsed or wiped over, in the dark or with dim lighting, at least on its layer side, with a liquid which substantially removes only the activator and perhaps the leuco dyestuff from the layer, but does not attack the dyestuff formed.

Heating during exposure may be effected in various ways. For instance, the plane surface on which the reproduction material rests during exposure may be a heating plate. Alternatively, the heat-treatment required may be effected by the influence of infra-red radiation. For this purpose, infra-red radiators are switched on during exposure, with their radiation directed on the reproduction material.

The following formulae illustrate some typical light-sensitive bis-indolyl-aryl methanes:

I.

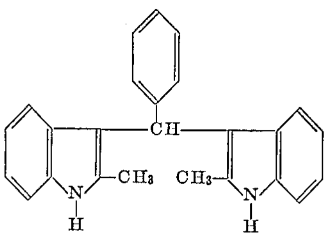

II.

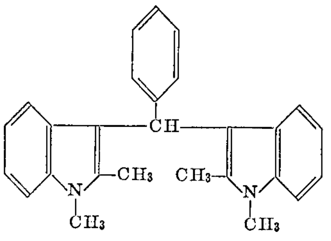

III.
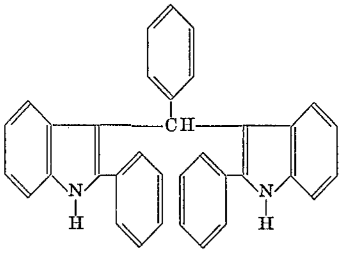
IV.
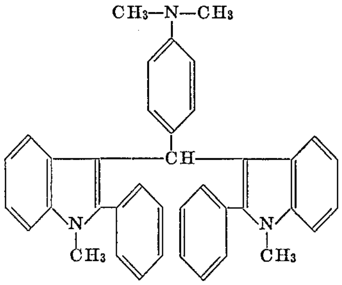
V.
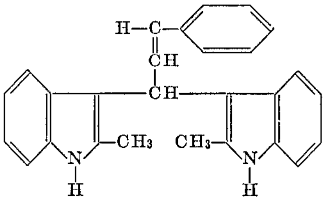
VI.
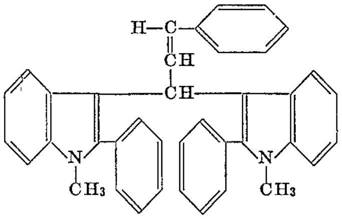
VII.
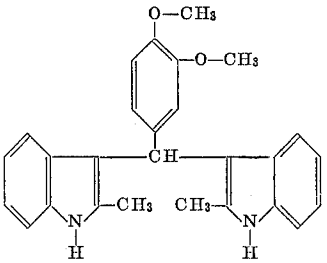
VIII.
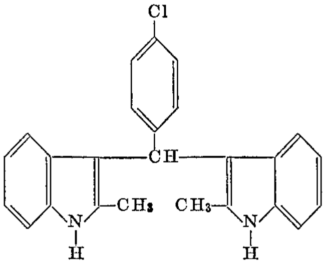
IX.
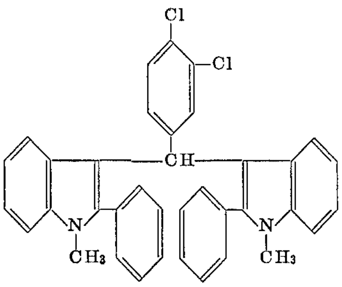
X.
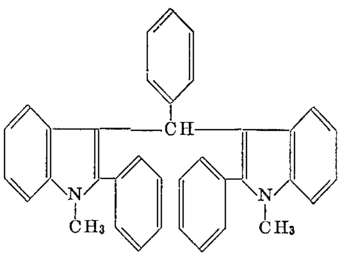
XI.
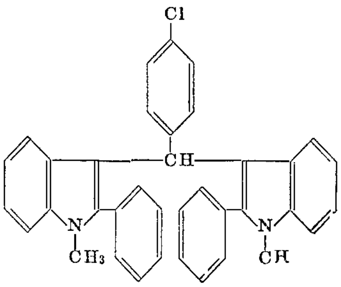
XII.
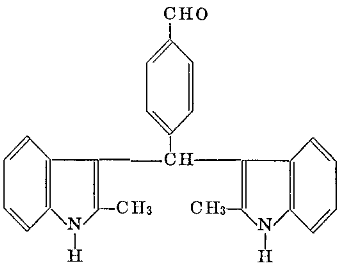
XIII.
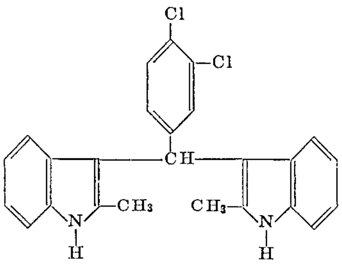
XIV.
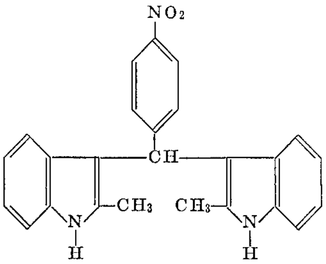
XV.
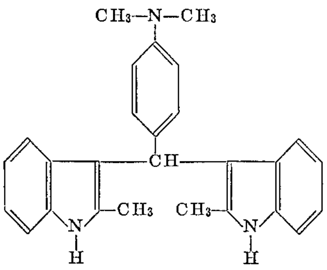
The following activators deserve particular mention:
Carboxylic acids:
2-acetoxy-benzoic acid
2-hydroxy-benzoic acid
3,4,5-trihydroxy-benzoic acid
2,4-dichloro-benzoic acid 2-bromo-5-nitro-benzoic acid
malic acid
glutaric acid
dibromo-succinic acid
malonic acid
maleic acid
oxalic acid
2-phenyl-quinoline-4-carboxylic acid
1-phenyl-pyazolone-(5)-3-carboxylic acid.

Carboxylic acid esters, carboxylic acid amides, aldehydes and ketones:

2,4-dihydroxy-benzoic acid methyl ester
2-hydroxy-benzoic acid ethyl ester
4-hydroxy-benzoic acid methyl ester
3-hydroxy-benzoic acid ethyl ester
3,5-dihydroxy-benzoic acid methyl ester
diaceto-succinic acid ethyl ester
carbamic acid ethyl ester
glycolic acid-n-butyl ester
tartaric acid diethyl ester
2-hydroxy-benzoic acid amide
3,4,5-trihydroxy-benzoic acid amide
pyridine-3-carboxylic acid amide
2,4,6-trihydroxy benzaldehyde
2-hydroxy-benzophenone
2,4-dihydroxy-benzophenone.

Thio compounds:
mercapto-benzthiazole
2-mercapto-benzoic acid
1-phenyl-5-mercapto-tetrazole
allyl thiourea
phenyl thiourea
3-bromo-diphenyl thiourea
4-chloro-diphenyl thiourea
N,N'-diphenyl thiourea
ethyliodide-allyl thiourea
diphenyl-disulfide-dicarboxylic acid
phenyl-trimercapto acetic acid
5-mercapto-4-ethyl-3-methyl-1,2,4-triazole
5-mercapto-3,4-dimethyl-1,2,4-triazole.

So far, about 100 further substances of each of the above groups have been tested, all of which have proved suitable for use in the reproduction material according to the invention.

The invention is to be further illustrated by means of the following example. The table contained in the example is, however, only a small selection of the large number of combinations possible.

EXAMPLES 0.1 g. of a bis-indolyl-aryl methane of the constitution indicated in column 1 of the following table and 0.1 g. of an activator the constitution of which is given in column 2 of the following table were dissolved in 10 ml. of acetone. This solution was whirl-coated onto a DIN A 4 sheet of baryta paper. The acetone was evaporated by blowing onto the rotating sheet with warm air.

The reproduction material prepared in this manner was then mounted to a metal vacuum frame heated to 100° C. and exposed with a 500 watt projector such as Leitz Prado 500. A 35 mm. silver negative film served as original. The enlargement scale was 1:10. The exposure times required are stated in column 3 of the following table. Column 4 describes the color of the image areas.

The exposed reproduction material was fixed by washing either with petrol ether or with a 1 percent potassium hydroxide solution.

| Example | Bis-indolylaryl methane | Activator | Exposure time (in sec.) | Color of the copy |
|---|---|---|---|---|
| 1 | I | Malonic acid | 30 | Red. |
| 2 | II | do | 30 | Red. |
| 3 | III | do | 120 | Grey. |
| 4 | V | do | 120 | Greyish-green. |
| 5 | VI | do | 120 | Do. |
| 6 | VII | do | 30 | Light red. |
| 7 | VIII | do | 30 | Dark red. |
| 8 | IX | do | 30 | Do. |
| 9 | XIV | do | 60 | Red-violet. |
| 10 | XV | do | 30 | Blue-violet. |
| 11 | I | 2-mercapto-benzthiazole | 30 | Red. |
| 12 | I | 2-mercapto-benzoic acid | 30 | Red. |
| 13 | I | 1-phenyl-5-mercapto-tetrazole | 15 | Red. |
| 14 | I | 3-bromo-diphenyl-thiourea | 60 | Red. |
| 15 | I | 5-mercapto-3,4-dimethyl-1.2.4-triazole. | 60 | Reddish-brown. |
| 16 | I | Malic acid | 60 | Red. |
| 17 | I | Gultaric acid | 60 | Red. |
| 18 | I | Citric acid | 60 | Red. |
| 19 | I | Tartaric acid | 30 | Red. |
| 20 | I | 3,4,5-trihydroxy-benzoic acid | 60 | Red. |
| 21 | I | 2,4-dichloro-benzoic acid | 60 | Red. |
| 22 | I | 2-phenylquinoline-4-carboxylic acid | 60 | Red. |
| 23 | I | 1-phenyl-pyrazolone-(5)-3-carboxylic acid. | 30 | Red. |
| 24 | I | 2,4-dihydroxy-benzoic acid methyl ester. | 120 | Red. |
| 25 | I | Malic acid anhydride | 60 | Red. |
| 26 | I | Pyridine carboxylic acid amide | 120 | Red. |
| 27 | I | 2-hydroxy-benzophenone | 120 | Red. |
| 28 | I | 2,4-dihydroxy-benzaldehyde | 60 | Red. |

The above examples have been presented for the purpose of illustration and should not be taken to limit the scope of the present invention. It will be apparent that the described examples are capable of many variations and modifications which are likewise to be included within the scope of the present invention as set forth in the appended claims.

What is claimed is:

1. Light-sensitive reproduction material comprising a support and a coating thereon of a composition consisting essentially of:

(a) one or more light-sensitive bis-indolyl-aryl-methane compounds of the general formula

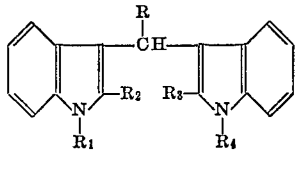

wherein:

R stands for aryl, substituted aryl, or alkenyl, $R_1$ and $R_4$ stand for H or methyl, and $R_2$ and $R_3$ stand for methyl or phenyl; and (b) an activator selected from the group of carboxylic acid, carboxylic acid ester, carboxylic acid amide, aldehyde, ketone, thioketone, thioalcohol, disulfide, and thiourea compounds having one or more >CO, >CS, —SH or —SS— groups.

2. Material according to claim 1 wherein said activator is present in said composition in an amount of from about 0.1 to 10 parts per part of bis-indoyl-aryl methane.

3. Material according to claim 1 wherein said bis-indolyl-aryl-methane is of said general formula wherein R is phenyl.

4. A method of forming an image which comprises: providing material according to claim 1 and image-wise exposing the coating of said material to visible light for a time sufficient to form a distinctly visible dye image in said coating.

5. The method of claim 4 further including the step, after said exposing step, of washing said coating with a solvent for said activator, said solvent being selected from the group consisting of aqueous alkaline solutions and liquid aliphatic hydrocarbons and being a non-solvent for said dye image, whereby said activator is removed from said coating, thereby fixing said image.

6. The method of claim 4 further including the step, performed concurrently with said exposing step, of heating said coating to a temperature of between about 70° and 110° C.

7. Material according to claim 1 wherein said bis-indolyl-aryl-methane is of said general formula wherein R is a mono- or dichloro-phenyl.

8. Material according to claim 1 wherein said bis-indolyl-aryl-methane is of said general formula wherein R is dimethoxy-phenyl.

References Cited

UNITED STATES PATENTS 3,164,467 1/1965 Sprague et al. ------ 96—90 X

NORMAN G. TORCHIN, Primary Examiner

R. F. FICHTER, Assistant Examiner

U.S. Cl. X.R.

96—48